Jan. 7, 1930.  R. N. CUNDALL  1,742,496
BOTTLE CAPPING MACHINE
Filed Jan. 30, 1925  2 Sheets-Sheet 1
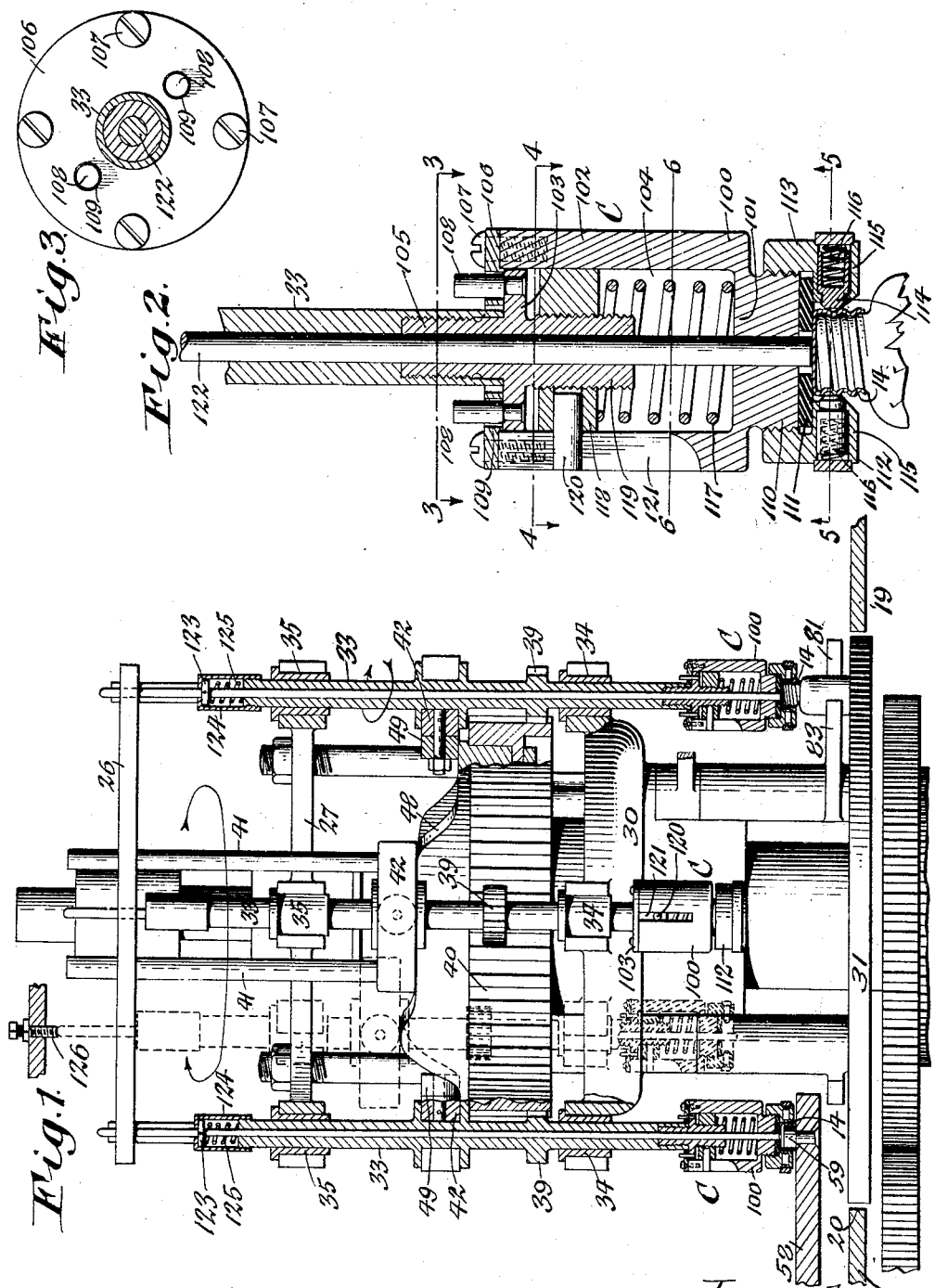

Jan. 7, 1930.  R. N. CUNDALL  1,742,496
BOTTLE CAPPING MACHINE
Filed Jan. 30, 1925  2 Sheets-Sheet 2
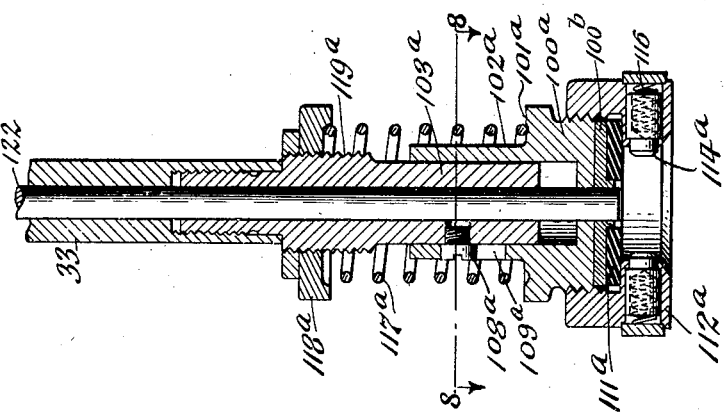
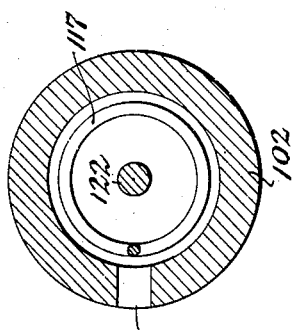
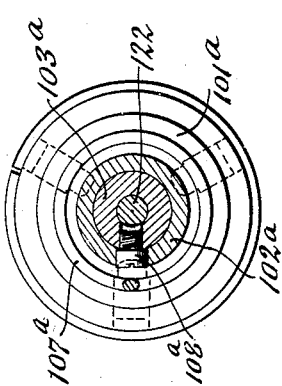
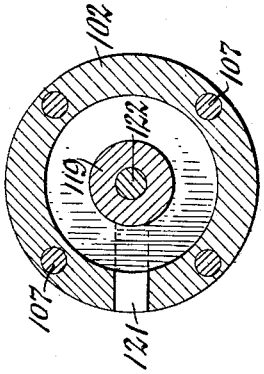
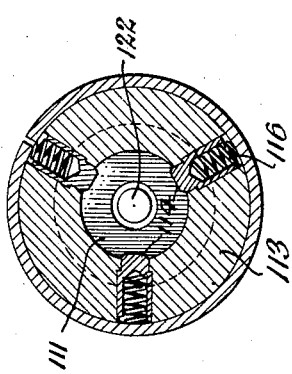
Inventor
Robert N. Cundall
by Pohh & Powers
Attorneys Patented Jan. 7, 1930

1,742,496

UNITED STATES PATENT OFFICE

ROBERT N. CUNDALL, OF BLASDELL, NEW YORK, ASSIGNOR TO CAPEM MACHINERY CORPORATION, OF BUFFALO, NEW YORK, A CORPORATION OF NEW YORK

BOTTLE-CAPPING MACHINE

Application filed January 30, 1925. Serial No. 5,877.

In my pending application for patent, Serial No. 577,418 I have disclosed a machine for applying caps or covers to bottles or jars wherein a series of cap applying chucks mounted on a rotatable head or turret is movable in relation to a cap feeder and to a bottle or jar feeder and performs the operations of taking the caps from the cap feeder and applying them to the bottles or jars successively advanced by the bottle or jar feeder.

My present invention relates to a machine of the above general type and more particularly to the cap applying chuck structure of such a machine.

The principal object of the present invention is to provide a cap applying chuck which is particularly adapted to enameled or highly finished caps in that all the pressure which may be required to screw the cap on the container is applied in such manner as to avoid marking or marring the surface of the cap.

The invention is illustrated in the accompanying drawings, wherein:—

Figure 1 is a view partly in side elevation and partly in vertical section showing certain features of the machine to which the invention is applicable and also showing different positions and operative conditions of chucks in which the features of the invention are incorporated.

Figure 2 is a detail vertical sectional view of the cap applying chuck.

Figures 3, 4, 5 and 6 are horizontal sectional views in the planes of the respective lines 3—3, 4—4, 5—5 and 6—6 of Figure 2.

Figure 7 is a vertical sectional view illustrating a modified construction.

Figure 8 is a horizontal sectional view on the line 8—8 of Figure 7.

Figure 1 shows such details of the machine as are necessary to an understanding of the features of operation and utility of the present invention. It is not deemed necessary to describe these machine features in any extended detail since they are fully described in my said co-pending application and since a brief recapitulation of these features, using therefor the same reference characters which are employed in my co-pending application, will suffice to make clear their operative relation to the chuck structure in which the invention consists.

The machine features illustrated in Figure 1 are the stationary table 19, the rotatable table 31 arranged within an opening 20 formed in the table 19, the upper head 26, the intermediate head 27 and the lower head 30, all of which heads and the table 31 are suitably coupled together to rotate as a unit, the stationary master gear 40 arranged between the heads 27 and 30, the stationary cam 48 arranged above the master gear, the fixed and movable jar clamping elements 81 and 83 mounted on the table 31, the rotatable cap feeding disk 58 and one of the cap holders 59 mounted on the disk 58. The parts above described are of the same form as the corresponding parts shown in my said co-pending application except that the stationary cam 48 has the profile of its working face varied so as to accomplish certain operations, to be hereafter described in detail, which are peculiar to the use of the chuck structure of the present invention.

The cap applying chucks are indicated generally at C and are operated both axially and rotatably by vertical shafts 33 mounted in suitable bearings 34 and 35 provided on the heads 30 and 27 respectively. Each of the shafts 33 is formed or provided with a pinion 39 which engages the master gear wheel 40, said gear wheel being of such extent from face to face that the engagement of the pinions 39 therewith is maintained throughout the range of axial movement of the shafts 33. The shafts 33 are also provided with cross heads 42 which carry guide rods 41 that work through openings in the head 26 and which also carry rollers 49 for co-operation with the profiled upper edge of the cam 48. Each cap applying chuck C is a self-contained unit removably fitted to its corresponding operating shaft 33.

Referring to Figures 1 to 6:

The chuck includes a body 100 having a base 101 and a cylindrical wall 102. A driving plate 103 is fitted in the chamber 104 delimited by the wall 102 and is connected to the shaft 33 by a central post 105 which is threaded in a socket formed at the end of said shaft. The body 100 is provided at its upper end with a hanger plate 106 which is secured to said body by screws 107 and which engages over the driving driving plate 103. The body 100 is rotated from the plate 103 by suitable connections which preferably consist of upright pins 108 provided on the driving plate and which project slidably through openings 109 formed in the hanger plate 106.

The base 101 has an externally threaded portion 110 of reduced diameter which projects below the wall 102 and against the under face of which is fitted a ring 111 of rubber or other suitable material by which the top of the cap can be engaged with the required friction to cause the cap to turn with the body 100. The friction ring 111 is confined in position by a ring 112 having an internally threaded flange 113 by which it is secured to the part 110 of the body 100 and is caused to have clamping co-operation with said part in holding the ring 111. The ring 112 is proportioned and arranged to encircle the threaded cylindrical part of the cap 14 and is provided with laterally movable jaws 114 which bear lightly upon the cylindrical cup and serve merely to hold the same in the chuck. The jaws 114 are preferably blunt nosed and this, in connection with the lightness of their pressure, prevents any injury to the surface of the cap, even though it be highly finished or enameled. The jaws 114 are preferably mounted in guideways 115 in the ring 112 and are backed by light helical springs 116 which react against an annular band suitably fitted on the ring, 112.

The body 100 is mounted for axial sliding movement relatively to the chuck operating shaft 33 and is normally forced downward to a position limited by the engagement of the plate 106 against the driving plate 103 by a helical spring 117 arranged in the chamber 104 and bearing against the base 101. In order that the pressure of the spring 117 may be regulated as conditions may require an adjustable head 118 is provided against which said spring re-acts at its upper end. The head 118 is threaded on a post 119 formed with and projecting downward from the plate 103 and by turning said head on the post it may be moved up or down according to the direction in which it is turned for the purpose of decreasing or increasing the pressure with which the spring 117 acts. In order to hold the head 118 against accidental turning movement said head is provided with a laterally projecting pin 120 which projects through a vertical slot 121 formed in the wall 102.

At a period of the operation of the chuck, as will be more fully described at a later point, it is desirable to insure that no cap remains within the ring 112 and for this purpose an ejector rod 122 is employed by which any cap for which a bottle or jar may not have been fed will be dislodged from the chuck. The rod 122 is mounted for axial movement in an axial bore of the shaft 33 and projects through openings in the driving plate 103 and in the base 102 and through the central opening of the friction ring 111, its lower end being normally slightly behind or above the engaging face of the ring 111. The rod 122 projects beyond the upper end of the shaft 33 and on its upper projecting part is provided with a head 123 which works in a casing 124 secured to the upper end of the shaft 33 and by engagement with the upper wall of said casing limits the upward movement of said rod. The head 123 is backed by a spring 125 arranged in the casing 124 and employed to hold the ejector rod normally retracted. At a period of the rotation of the table 31 the rod 122 at its upper extremity engages a fixed stop 126 (Figure 1) by which as the shaft 33 is elevated the rod 122 is relatively lowered, that is to say held against being elevated and hence projected beyond the engaging face of the friction disk 111, with the result of dislodging from the chuck the cap, if any there be, which may be held by the jaws 114 at such time.

In Figure 1 there is illustrated by broken lines the position and condition of a chuck at the time the ejector 122 is operated. Thereafter due to the profile of the cam 48 the chuck moves downward until it comes to a position in which it is aligned with a cap 14 fitted on a holder 59 of the rotating cap feeder 58. As the chuck thus moves downward the ejector (its upper end receding from the stop 126) is restored to its normal retracted position by the spring 125. The downward movement of the chuck when alined with the cap 14 on the holder 59 is continued until the ring 112 encircles said cap, the jaws 114 are in engagement with the cylindrical wall of the cap, and the friction ring 111 is in engagement with the top surface of the cap. This position and condition of the chuck is illustrated in the case of the chuck shown at the left side of Figure 1. As the rotation of the table 31 continues the chuck is then raised, carrying the cap with it, to an elevation at which it will clear the bottle or jar which has been advanced into capping position by the bottle or jar feed mechanism (not shown). The chuck then descends until the cap engages the neck of the bottle or jar and its further direct descent is arrested. The shaft 33, however, continues its downward movement at a suitably controlled rate whereby the spring 117 urges the chuck downward relatively to said shaft and thus causes the friction disk 111 to bear with such pressure against the cap that the latter will rotate with the chuck. This relation between the shaft 33 and the chuck is continued during the further rotation of the table 31 with the result that the chuck screws the cap upon the jar or bottle, the chuck, of course, moving downward while this operation is taking place. The completion of this operation is shown in the case of the chuck at the right side of Figure 1. Thereafter, the jar being held against upward displacement by the clamping elements 81 and 83 the chuck is raised so as to disengage it from the jar which is thereupon ejected from the machine in the manner described in my said pending application, this raising of the chuck being continued until the chuck is brought to the position and condition shown by broken lines in Figure 1. It will be noted that the stop 126 by which the ejector 122 is actuated may be adjustable and for this purpose may be in the form of a screw which can be set at any desired position.

The modified construction shown in Figures 7 and 8 embodies the same principles of operation as the construction above described but differs in details of its organization. In this case the shaft 33 is provided with a detachable axial extension 103$^a$ which forms a part of the chuck unit and has a sliding fit in a cylinder 102$^a$ incorporated with the chuck body 100$^a$. The driving plate 103 of the construction first described is not employed but instead the extension 103$^a$ is provided with a laterally projecting pin 108$^a$ which engages in a vertical slot 109$^a$ in the cylinder 102$^a$ and thereby transmits rotation to the chuck body while permitting the same to slide axially relatively to the extension 103$^a$. The chuck body is urged downward relatively to said extension 103$^a$ by a helical coil spring 117$^a$ which surrounds the cylinder 102$^a$ and bears at its lower end against a shoulder 101$^a$ formed on the chuck body and at its upper end against a head 118$^a$ adjustably mounted on a threaded portion 119$^a$ of the extension 103$^a$. The modified construction includes the friction ring, here designated 111$^a$, the cap engaging jaws, here designated 114$^a$ and the ring 112$^a$ in which said jaws are mounted, these parts having the same form, arrangement and mode of operation that they have in the construction first described.

Instead of engaging the lower end of the body directly with the friction ring, a disk may be interposed between these members, such a disk 100$^b$ being shown for example in Figure 7 between the body 100$^a$ and the friction ring 111$^a$.

Having fully described my invention, I claim:—

In a bottle capping machine, a rotary cap applying chuck in combination with an axially movable rotatable operating shaft therefor, said chuck comprising a body mounted adjacent one end of the shaft for relative axial movement, spring means for urging said body outward relatively to said shaft, a tubular member projecting from said body and providing a cap receiving socket, friction means positioned in said socket for driving engagement with the top of a cap, said tubular member having radial recesses which communicate with said socket, jaw elements slidably mounted in said recesses and projecting into said socket, the projected ends of said elements being adapted to engage and support a cap within the socket, yieldable means for holding said jaws in their projected position, means to drive said body from said shaft.

In testimony whereof I affix my signature.

ROBERT N. CUNDALL.